US012600683B2

(12) United States Patent
Tucker et al.

(10) Patent No.: US 12,600,683 B2
(45) Date of Patent: Apr. 14, 2026

(54) METHODS OF FORMING BONDED ARTICLES INCLUDING SIMILAR OR DISSIMILAR MATERIALS AND RELATED ARTICLES

(71) Applicants: Battelle Energy Alliance, LLC, Idaho Falls, ID (US); Honeywell Federal Manufacturing & Technologies, LLC, Kansas City, MO (US)

(72) Inventors: Dennis S. Tucker, Idaho Falls, ID (US); Arin S. Preston, Idaho Falls, ID (US); Jorgen F. Rufner, Idaho Falls, ID (US); Dennis Eichorst, Lenexa, KS (US); Connor Chadbourne, Salt Lake City, UT (US); Luke Hanner, Kansas City, MO (US)

(73) Assignees: Honeywell Federal Manufacturing & Technologies, LLC, Kansas City, MO (US); Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 18/924,331

(22) Filed: Oct. 23, 2024

(65) Prior Publication Data

US 2025/0136519 A1 May 1, 2025

Related U.S. Application Data

(60) Provisional application No. 63/593,137, filed on Oct. 25, 2023.

(51) Int. Cl.
*C04B 37/00* (2006.01)
*B22F 3/10* (2006.01)
(Continued)

(52) U.S. Cl.
CPC .............. *C04B 37/001* (2013.01); *B22F 3/10* (2013.01); *B22F 7/008* (2013.01); *C04B 37/021* (2013.01);
(Continued)

(58) Field of Classification Search
CPC .......... B22F 10/00; B22F 10/10; B22F 10/12; B22F 10/14; B22F 10/16; B22F 10/18;
(Continued)

(56) References Cited

U.S. PATENT DOCUMENTS 6,515,250 B2 2/2003 Miyasaka et al.
8,287,673 B2 10/2012 Tucker et al.
(Continued)

FOREIGN PATENT DOCUMENTS

CN 109048030 A 12/2018
EP 3326986 A1 5/2018
(Continued)

OTHER PUBLICATIONS

Machine Translation of EP3725435A1, Oct. 21, 2020 (Generated Jan. 28, 2025), Espacenet (Year: 2020).*
(Continued)

*Primary Examiner* — Andrew L Swanson
(74) *Attorney, Agent, or Firm* — Hovey Williams LLP

(57) ABSTRACT

A method of forming an article includes partially sintering a first feed material to form a first preform. The first preform exhibits a density percentage of from about 50% to about 90% of a theoretical maximum sintering density of the first preform. The method further includes partially sintering a second feed material to form a second preform. The second preform exhibits a density of from about 50% to about 90% of a theoretical maximum sintering density of the second preform. The first preform is positioned adjacent to the second preform, and the first preform is bonded to the
(Continued)

102

104 second preform via a final sintering process to form a bonded article. Additional methods and articles are disclosed.

18 Claims, 7 Drawing Sheets

(51) Int. Cl.
| | |
|---|---|
| *B22F 7/00* | (2006.01) |
| *C04B 37/02* | (2006.01) |
| *B33Y 10/00* | (2015.01) |

(52) U.S. Cl.
CPC ........... *B33Y 10/00* (2014.12); *C04B 2237/32* (2013.01); *C04B 2237/40* (2013.01)

(58) Field of Classification Search
CPC .......... B22F 10/60; B22F 10/64; B22F 10/66; B22F 7/00; B22F 7/002; B22F 7/008; B22F 7/06; B22F 7/062; B22F 7/064; B22F 2007/066; B22F 2007/068; B29C 64/156
See application file for complete search history.

(56) References Cited

U.S. PATENT DOCUMENTS

| | | | |
|---|---|---|---|
| 8,940,220 | B2 | 1/2015 | Raj et al. |
| 8,956,478 | B2 | 2/2015 | Allemand et al. |
| 9,056,354 | B2 | 6/2015 | Merrill et al. |
| 9,096,471 | B2 | 8/2015 | Suzuki et al. |
| 9,162,931 | B1 | 10/2015 | Hoffman et al. |
| 10,008,341 | B2 | 6/2018 | Nayak et al. |
| 11,465,243 | B2 | 10/2022 | Mann et al. |
| 11,999,011 | B1 | 6/2024 | Moorehead et al. |
| 2012/0136400 | A1* | 5/2012 | Julien .................. B22F 3/1021 |
| | | | 606/86 R |
| 2013/0177740 | A1* | 7/2013 | Merrill ................... B22F 5/009 |
| | | | 427/535 |
| 2016/0158840 | A1 | 6/2016 | Cologna et al. |
| 2019/0112225 | A1 | 4/2019 | Mix et al. |
| 2024/0286190 | A1* | 8/2024 | Morrison ................. F28F 7/02 |

FOREIGN PATENT DOCUMENTS

| | | | |
|---|---|---|---|
| EP | 3725435 | A1 * | 10/2020 |
| WO | 2018/024778 | A1 | 2/2018 |

OTHER PUBLICATIONS

Levit et al., "Interphases Formation and Analysis at the Lithium-Aluminum-Titanium-Phosphate (LATP) and Lithium-Manganese Oxide Spinel (LMO) Interface During High-Temperature Bonding", Energy Technology, vol. 8, (2020), 12 pages.

Liu et al., "In Situ Joining of Dissimilar Nanocrystalline Materials by Spark Plasma Sintering", Science Direct, Scripta Materialia, vol. 48, (2003), 6 pages.

Tomse et al., "Nanostructured Multicomponent Nd—Fe—B Magnets Prepared by a Spark-Plasma-Sintering Approach", Journal of Magnetism and Magnetic Materials, vol. 533, (2021), 11 pages.

Nisar, Ambreen et al., Mechanical and Materials Engineering, Florida International University, Unconventional Materials Processing Using Spark Plasma Sintering, Webpage <https://www.mdpi.com/2571-6131/4/1/3>, Jan. 2021, 21 pages.

* cited by examiner

400

402 — PROVIDE A FEED MATERIAL FOR THE FORMATION OF AT LEAST A FIRST PREFORM AND A SECOND PREFORM

404 — SINTER THE FIRST PREFORM AND THE SECOND PREFORM IN A PARTIAL SINTERING PROCESS

406 — POSITION THE FIRST PREFORM AND THE SECOND PREFORM ADJACENT TO EACH OTHER IN THE SINTERING ASSEMBLY

408 — BOND THE FIRST PREFORM TO THE SECOND PREFORM IN A FINAL SINTERING PROCESS

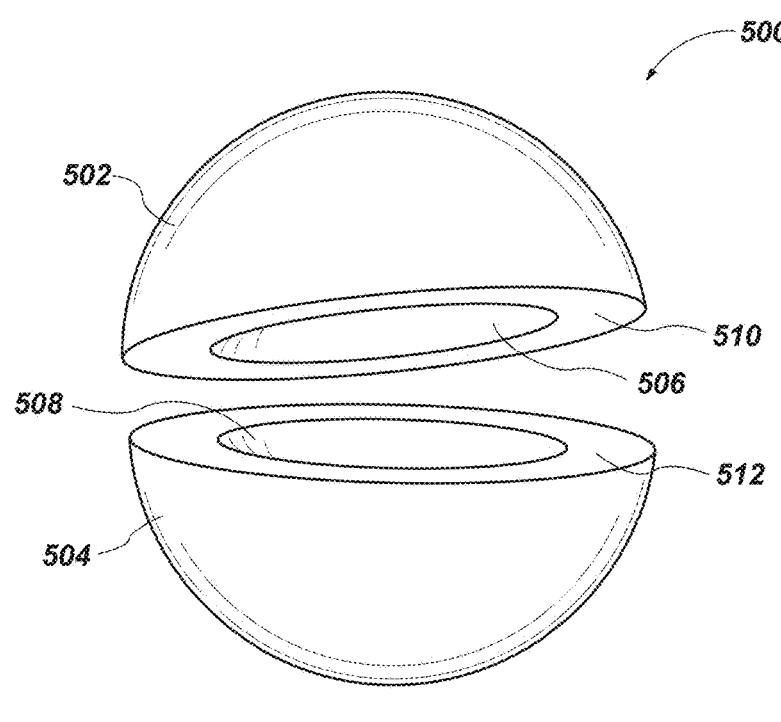
FIG. 5A
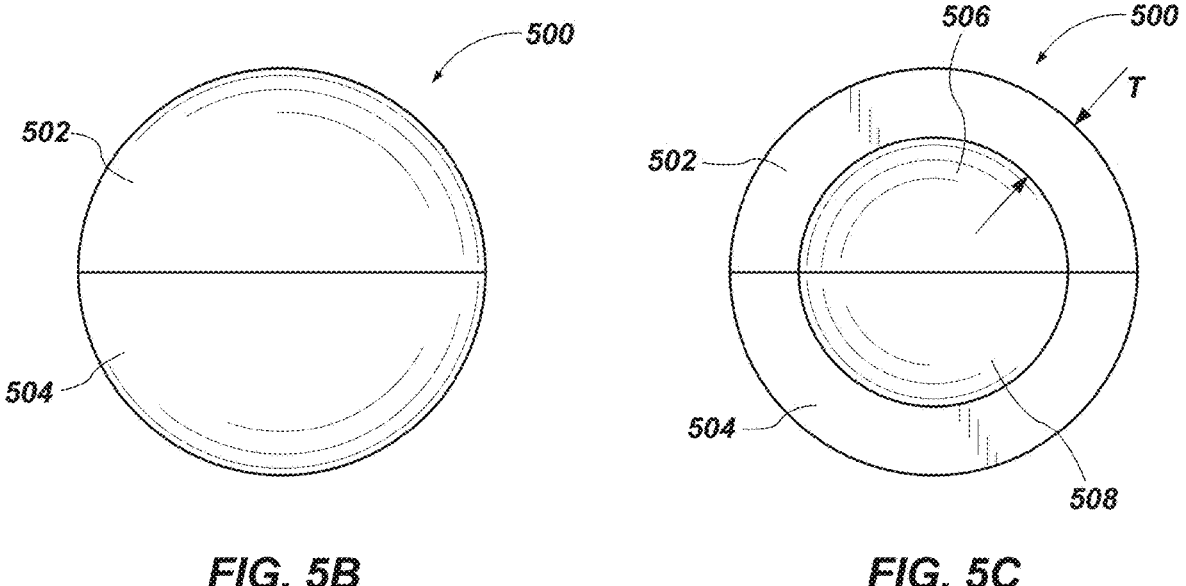
FIG. 5B                    FIG. 5C

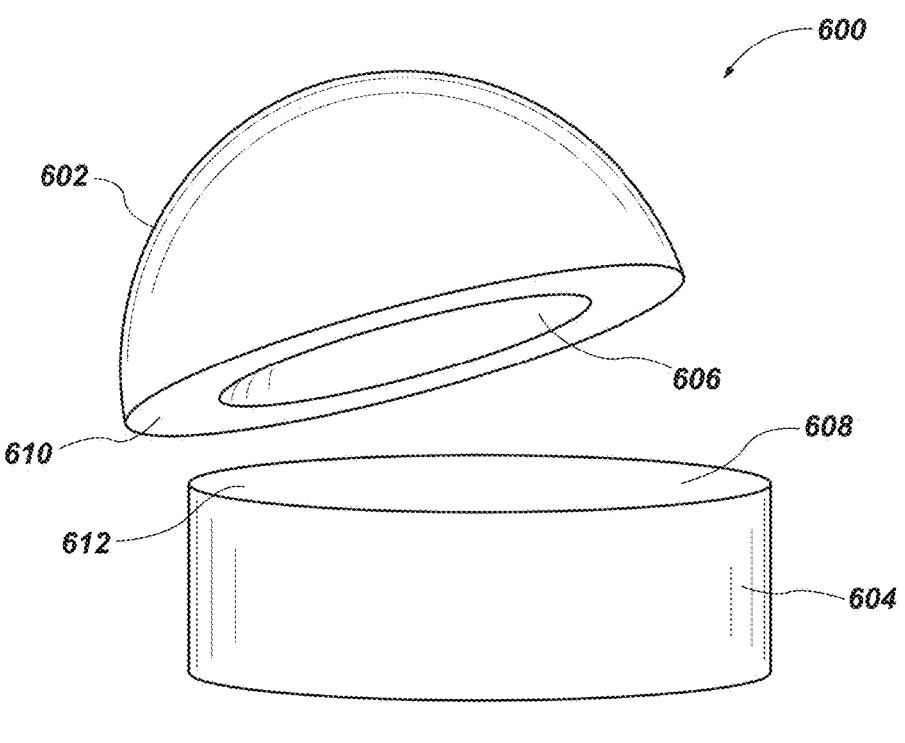
*FIG. 6A*
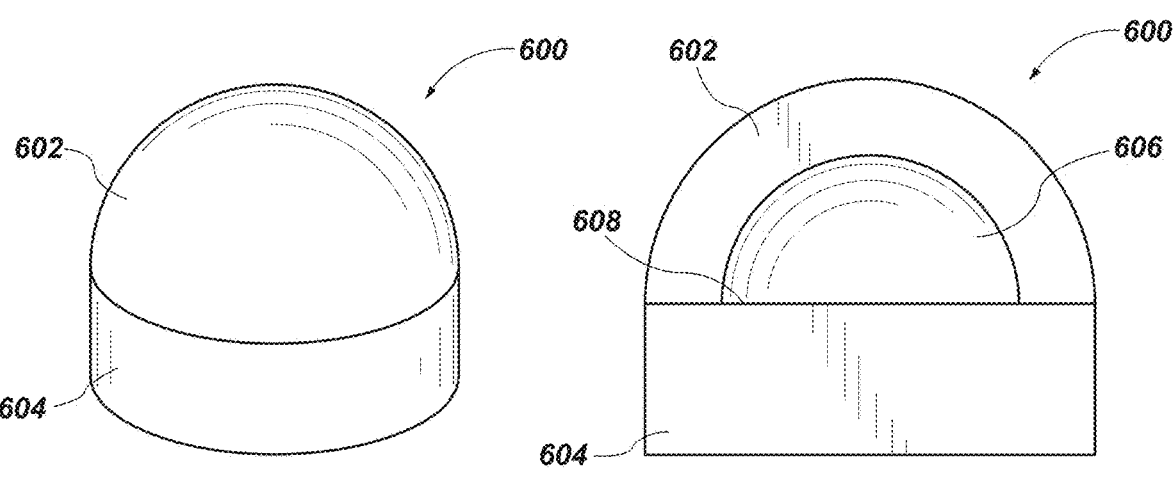
*FIG. 6B*          *FIG. 6C*

METHODS OF FORMING BONDED ARTICLES INCLUDING SIMILAR OR DISSIMILAR MATERIALS AND RELATED ARTICLES

CROSS-REFERENCE TO RELATED APPLICATION

This application claims the benefit under 35 U.S.C. § 119(e) of U.S. Provisional Patent Application Ser. No. 63/593,137, filed Oct. 25, 2023, for "METHODS OF BONDING OF SIMILAR AND DISSIMILAR MATERIALS AND RELATED ARTICLES," the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517, awarded by the United States Department of Energy. This invention was also made with government support under Contract Number DE-NA0002839, awarded by the United States Department of Energy. The government has certain rights in the invention.

TECHNICAL FIELD

Embodiments of the disclosure relate generally to bonded articles. More specifically, the disclosure relates to the joining of similar and dissimilar materials by sintering a first partially sintered material and a second partially sintered material and to the resulting articles.

BACKGROUND

Many of today's high-performance technologies (e.g., nuclear reactors, electronics, and aerospace) use advanced materials. The advanced materials are often made of metal and/or ceramic materials that are able to withstand extreme conditions (e.g., extreme temperature and/or other environmental conditions) and/or meet exacting specifications. The bonding of such materials may be required during the manufacturing of such articles.

Examples of bonding techniques known in the art include diffusion welding, explosion welding, hot pressing, and rotational friction welding. The bonding of the materials using these techniques is induced by high temperatures and pressures. One of the drawbacks of conventional methods is the use of interlayers, powders, epoxies, or cements (e.g., ceramic cements). The use of interlayers and the limited grain boundary migration resulting from conventional methods often creates a weaker bond between the materials.

The results of the above-mentioned methods and the resulting limited grain boundary migration across the interface often result in a visible bond line. Additionally, the interface of the bonded materials includes defects such as microstructural discontinuities (e.g., phase particles and pores), which are detrimental to the mechanical properties of the bonded article. This is evidenced by the noticeable reduction of strength of the bonded article compared to that of the base materials. Post-process heat treatment conducted at a material specific temperature may achieve some grain boundary migration and help mitigate the presence of such discontinuities, but the post-process heat treatment has limitations including inefficient energy usage, geometric distortion, and oxidation of the bonded article.

SUMMARY

In one aspect, a method of forming an article includes partially sintering a first feed material to form a first preform. The first preform exhibits a density percentage of from about 50% to about 90% of a theoretical maximum sintering density of the first preform. The method further includes partially sintering a second feed material to form a second preform. The second preform exhibits a density of from about 50% to about 90% of a theoretical maximum sintering density of the second preform. The first preform is positioned adjacent to the second preform, and the first preform is bonded to the second preform via a final sintering process to form a bonded article.

In one aspect, a method of forming an article includes forming a first preform exhibiting a density percentage of from about 50% to about 90% of a theoretical maximum sintering density of a first feed material used to form the first preform. A second preform is formed exhibiting a density of from about 50% to about 90% of a theoretical maximum sintering density of a second feed material used to form the second preform. The first preform is positioned directly adjacent to the second preform, and the first preform is bonded to the second preform via a final sintering process to form a bonded article.

In one aspect, an article includes a first preform bonded to a second preform. The first preform includes a ceramic material or a metal material. The second preform includes the ceramic material, a different ceramic material, the metal material, or a different metal material. The first preform and the second preform lack a visible bonding interface therebetween.

BRIEF DESCRIPTION OF THE DRAWINGS

For a detailed understanding of the disclosure, reference should be made to the following detailed description, taken in conjunction with the accompanying drawings, in which like elements have generally been designated with like numerals, and wherein:

FIG. 5A is a perspective, exploded view of an article formed by bonding partially sintered parts in accordance with embodiments of the disclosure;

FIG. 5B is a side view of the article shown in FIG. 5A;

FIG. 5C is a side section view of the article shown in FIG. 5A;

FIG. 6A is a perspective, exploded view of an article formed by bonding partially sintered parts in accordance with embodiments of the disclosure;

FIG. 6B is a perspective view of the article shown in FIG. 6A;

FIG. 6C is a side section view of the article shown in FIG. 6A;

DETAILED DESCRIPTION

Figure 1B:
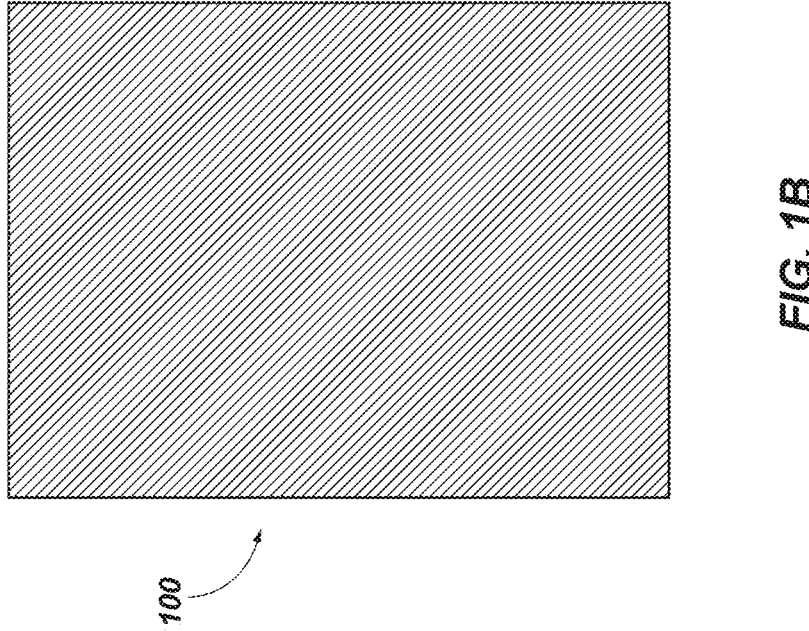
FIG. 1B is a schematic diagram of a bonded article, according to embodiments of the disclosure, formed from two similar materials.

The illustrations presented herein are not actual views of any bonded articles, or any component thereof, but are merely idealized representations, which are employed to describe embodiments of the disclosure.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of embodiments of the disclosure, and such term is used in preference to the more restrictive term "is" so as to avoid any implication that other compatible materials, structures, features, and methods usable in combination therewith should or must be excluded.

As used herein, any relational term, such as "first," "second," "top," "bottom," "upper," "lower," "above," "beneath," "side," "upward," "downward," etc., is used for clarity and convenience in understanding the disclosure and accompanying drawings and does not connote or depend on any specific preference or order, except where the context clearly indicates otherwise. For example, these terms may refer to an orientation of elements of any bonded article when utilized in a conventional manner. Furthermore, these terms may refer to an orientation of elements of any bonded article as illustrated in the drawings.

Drawings presented herein are for illustrative purposes only and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the terms "configured" and "configuration" refers to a size, a shape, a material composition, a material distribution, orientation, and arrangement of at least one feature (e.g., one or more of at least one structure, at least one material, at least one region, at least one device) facilitating use of the at least one feature in a pre-determined way.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "about" or "approximately" used in reference to a given parameter is inclusive of the stated value and has the meaning dictated by the context (e.g., it includes the degree of error associated with measurement of the given parameter, as well as variations resulting from manufacturing tolerances, etc.).

As used herein, the term "sintering process" may be understood to include the terms "spark plasma sintering (SPS) process" and "electrical field assisted sintering (EFAS) process." However, it may also be understood that the term "sintering process" may include other suitable sintering processes (e.g., hot-press sintering process).

The term "sintering process" refers collectively to a partial sintering process (e.g., to form the partially sintered preforms) and a final sintering process (e.g., to form the bonded article). The term "partial sintering process" is used herein to refer to the sintering process used to form partially sintered preforms, where the feed material of the partially sintered performs is sintered to a density percentage lower than a theoretical maximum sintering density (e.g., a density percentage of less than about 90% of the theoretical maximum sintering density). A "theoretical maximum sintering density" refers to a theoretical maximum density to which a given feed material may be sintered. Accordingly, partially sintered preforms formed during the partial sintering process may still undergo further sintering in a bonding process. The term "final sintering process" is used herein to refer to the sintering process used to form a bonded article from the partially sintered preforms. In the bonded article, the feed material of the first and second preforms may be sintered to a final desired density percentage of the theoretical maximum sintering density (e.g., a density percentage of 90% or more of the theoretical maximum sintering density).

As used herein, the term "feed material" means and includes a solid material not yet at a desired densified (e.g., sintered) state. The feed material may comprise a loose (e.g., flowable) solid powder, solid particles, solid flakes, or other solid masses of small sizes, such as metal powders or ceramic powders.

The disclosure includes methods of partially sintering component parts of an article and forming bonded articles from the partially sintered components (e.g., preforms) and articles formed by such methods. The preforms to be bonded may be formed of similar materials or of dissimilar materials. The bonded articles may be used in a variety of applications including, but not limited to, manufacturing and testing applications. The bonded articles may be configured for use in a variety of industries (e.g., in electronics, nuclear, or aerospace industries), such as those where extreme conditions (e.g., extreme temperature and/or other environmental conditions) occur during use and operation of the bonded articles.

In conventional methods for the formation of articles via sintering, a part may be formed via the direct synthesis of a final article (e.g., the direct sintering of a final article from one or more powdered base materials or the sintering of a powdered material onto a substrate). In such methods of formation of articles using sintering, it may be difficult to form articles having complex geometries, to form articles with different components having different materials, or to form articles having component parts with differing sizes and/or geometries. Further, in conventional methods of forming articles using conventional bonding techniques, a bonded article may exhibit a visible bond line indicating a smaller bonding gradient between the base materials of the component parts, which results in a weaker bond between the base materials.

With conventional joining operations, some materials, such as ceramic materials, present a unique problem as they tend to shatter when an attempt is made to bond them. One potential cause is the inability of a fully dense ceramic to deform during the bonding process. Attempts to bond ceramics use extensive preparation to reduce the likelihood of shatters and cracks within the ceramic article. Even with this extensive preparation, cracks still often occur within ceramic material. Therefore, sintered articles formed from ceramic materials are sintered in a single process (e.g., directly sintered to a final article from a powdered material or the sintering of a powdered material onto a substrate). This, however, limits the geometries and compositions that may be formed with ceramic material.

In embodiments of the disclosure, partially sintered preforms (e.g., component parts to be bonded together into an article) are formed by partially sintering feed material to form a desired geometry of each of the partially sintered preforms. Each of the partially sintered preforms may be formed of the same material as one another, or each partially sintered preform may be formed from different materials. For example, the partially sintered preforms may be formed by applying a high current density (e.g., electric current) and/or pressure to the feed material. The electric current and/or pressure may be applied across the feed material. The feed material of each of the partially sintered preforms may be sintered separately (e.g., in a separate sintering process) to form at least a first preform (e.g., a first partially sintered preform) and a second preform (e.g., a second partially sintered preform). The first preform and the second preform may then be sintered together to form the bonded article, such as by applying a high current density (e.g., electric current) and/or pressure across the first preform and the second preform.

The bonding of the partially sintered preforms produces a bonded article having an interface with reduced defects between the bonded preforms relative to a bonded interface formed by conventional bonding techniques. The use of the partially sintered preforms may decrease the total amount of time used to produce the bonded article compared to conventional techniques. The decreased production time may increase the speed at which bonded articles are produced and may reduce energy costs associated with the production. Following the partial sintering process, the preforms may still be malleable (e.g., deformable). In the final sintering process (e.g., final bonding process), lower densities of the partially sintered preforms may provide increased surface energy for particle rearrangement to fill/close gaps or internal voids within the preforms. The particle rearrangement may substantially reduce or eliminate porosities in the preforms and diffuse atoms of the preforms together into a substantially fully densified bonded article. One or more dimensions of the one or more preforms may be selectively configured to deform up to a predetermined percentage of the dimension of the one or more preforms during the final sintering process. For example, a height of one or more preforms may be configured to deform up to about 50%, up to about 40%, up to about 30%, up to about 20%, up to about 10%, up to about 5%, or up to about 1%.

Figure 1A:
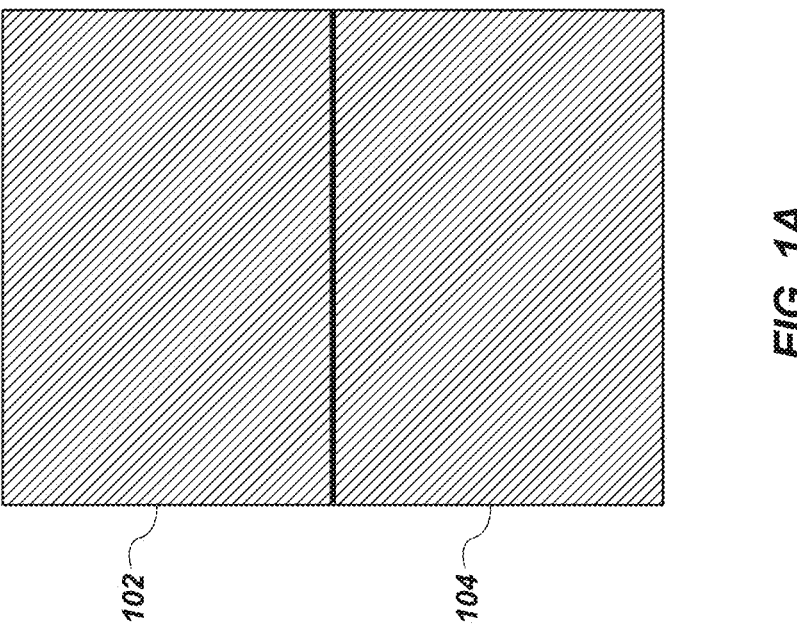
FIG. 1A is a schematic diagram depicting a first partially sintered preform and a similar second partially sintered preform according to embodiments of the disclosure.

As shown in FIG. 1A and FIG. 1B, a first component part of an article may be partially sintered (e.g., undergo a preform sintering process (e.g., the partial sintering process)) to form a first preform 102 and a second component part of the article may be partially sintered (e.g., undergo a preform sintering process (e.g., the partial sintering process)) to form a second preform 104. The feed materials of the first preform 102 and the second preform 104 may be partially sintered to less than a theoretical maximum sintering density. In some embodiments, the first preform 102 and the second preform 104 may be formed from similar materials. In some embodiments, the feed materials of the first preform 102 and the second preform 104 may each be partially sintered to a density of up to about 90% of the theoretical maximum sintering density of the feed material forming the first preform 102 and the second preform 104.

In some embodiments, the feed material of the first preform 102 may be partially sintered to a density equal to a predetermined percentage of the theoretical maximum sintering density, such as from about 50% of the theoretical maximum sintering density to about 90% of the theoretical maximum sintering density, from about 55% of the theoretical maximum sintering density to about 85% of the theoretical maximum sintering density, or from about 60% of the theoretical maximum sintering density to about 80% of the theoretical maximum sintering density. Similarly, the feed material of the second preform 104 may be partially sintered to a density equal to a predetermined percentage of a theoretical maximum sintering density of the second feed material, such as from about 50% of the theoretical maximum sintering density to about 90% of the theoretical maximum sintering density, from about 55% of the theoretical maximum sintering density to about 85% of the theoretical maximum sintering density, or from about 60% of the theoretical maximum sintering density to about 80% of the theoretical maximum sintering density. The predetermined percentage of the theoretical maximum sintering density of the first preform 102 may be the same as the predetermined percentage of the theoretical maximum sintering density of the second preform 104. Alternatively, the predetermined percentage of the theoretical maximum sintering density of the first preform 102 may be different than the predetermined percentage of the theoretical maximum sintering density of the second preform 104. By sintering the feed materials of the first preform 102 and the second preform 104 to less than or equal to about 90% of the theoretical maximum sintering density, the first preform 102 and the second preform 104 may exhibit a degree of malleability following the partial sintering process and before conducting the final sintering process.

The feed material used to form the first preform 102 and the second preform 104 may be similar in that each material comes from a similar category of materials. For example, the feed material may be a ceramic, a metal or metal alloy, or a composite. Alternatively, the feed material may each come from a similar subclass of materials (e.g., each material may be an alkali metal, an alkaline earth metal, a ferrous metal, a transition metal, a post-transition metal, a lanthanide, an actinide, a heavy metal, a refractory metal, a metal oxide (alumina (e.g., aluminum oxide), yttria (e.g., yttrium oxide)), a non-metal oxide, a carbide (e.g., boron carbide), or a nitride (e.g., titanium nitride)). The metal may, for example, be, aluminum, copper, nickel, tungsten, yttrium, or a combination thereof. Alternatively, or additionally, the feed material of the first preform 102 and the second preform 104 may be similar such that they exhibit one or more similar properties, such as a chemical composition, a lattice structure, a melting point, a sintering temperature, or a coefficient of thermal expansion (CTE). The similar property of the feed material of the first preform 102 and the second preform 104 may differ from one another by less than or equal to about 35%, such as less than or equal to about 20%, less than or equal to about 15%, less than or equal to about 10%, less than or equal to about 5%, less than or equal to about 3%, or less than or equal to about 1%. In some embodiments, a chemical composition of the material of the first preform 102 and the second preform 104 are substantially identical.

In some embodiments, the feed material of the first preform 102 and the second preform 104 may be electrically conductive. In some embodiments, the feed material of the first preform 102 and the second preform 104 may be electrically insulative.

The first preform 102 and the second preform 104 may be sintered together to form a bonded article 100, as shown in FIG. 1B, by the final sintering process. A final density of the resulting bonded article 100 may be about equal to or greater than a predetermined percentage of the theoretical maximum sintering density. The final density of the bonded article 100 may be greater than or equal to about 90% of the theoretical maximum sintering density, such as greater than about 95% of the theoretical maximum sintering density, greater than about 97% of the theoretical maximum sintering density, greater than about 98% of the theoretical maximum sintering density, or greater than about 99% of the theoretical maximum sintering density.

In some embodiments, except for bonded articles 100 having first preforms 102 and second preforms 104 of different colors, the bonded article 100 may exhibit no visible interface (e.g., bond line) between the first preform 102 and the second preform 104. An interface between the first preform 102 and the second preform 104 in the resulting bonded article 100 may not be visible to the naked eye or with optical microscopy, such as stereo microscopy or scanning electron microscopy. In some embodiments, the bonded article 100 has no interface that is visible with microscopy techniques that are configured to achieve up to about a 2000× magnification. The absence of an interface may indicate a stronger bond between the first preform 102 and the second preform 104, which may result in greater mechanical strength of the bonded article 100 as compared with articles bonded by conventional techniques. However, bonded articles 100 having first preforms 102 and second preforms 104 of different colors may exhibit a visible interface (e.g., a bond line) between the first preform 102 and the second preform 104.

Figure 2B:
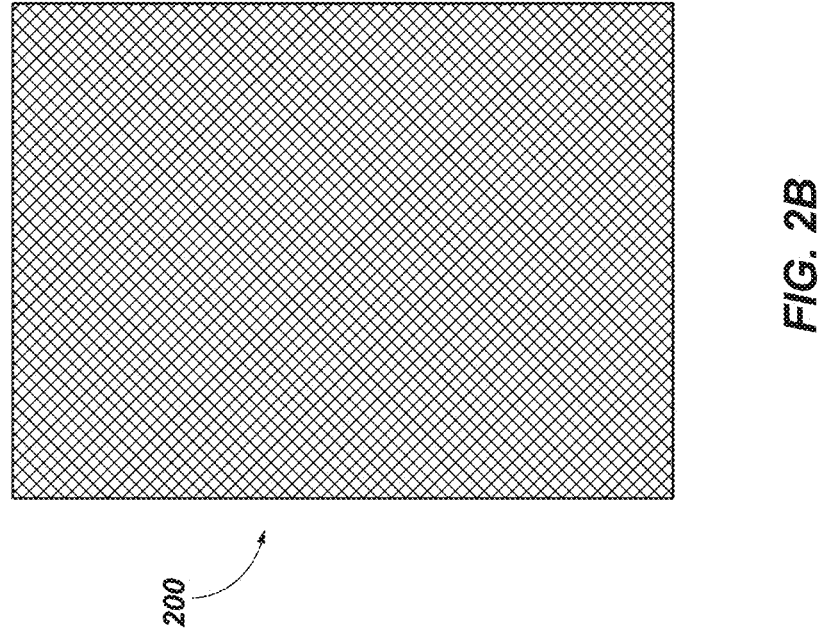
FIG. 2B is a schematic diagram of a bonded article, according to embodiments of the disclosure, formed from two dissimilar materials.
Figure 2A:
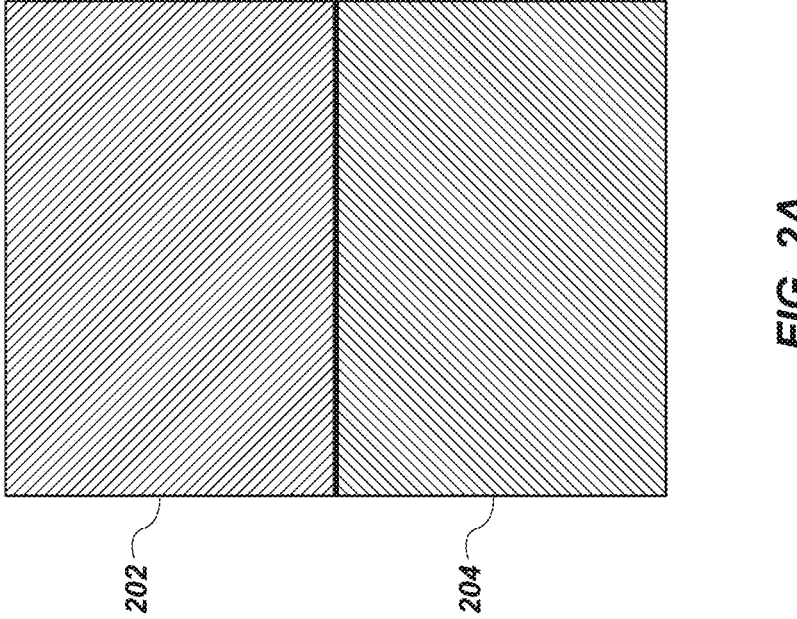
FIG. 2A is a schematic diagram depicting a first partially sintered preform and a dissimilar second partially sintered preform according to embodiments of the disclosure.

The above-described bonding of components parts to form an article may also be applicable to component parts formed from different materials. As shown in FIG. 2A and FIG. 2B, a first component part of an article may be partially sintered (e.g., undergo a preform sintering process (e.g., the partial sintering process)) to form a first preform 202 and a second component part of an article may be partially sintered (e.g., undergo a preform sintering process (e.g., the partial sintering process)) to form a second preform 204. The feed materials of the first preform 202 and the second preform 204 may be partially sintered to less than a theoretical maximum sintering density of each of a first feed material used for the first preform 202 and a second feed material used for the second preform 204, where the second feed material is different from the first feed material. In some embodiments, the feed materials of the first preform 202 and the second preform 204 may be partially sintered to a density of about 90% of the theoretical maximum sintering density of the respective materials forming the first preform 202 and the second preform 204.

In some embodiments, the first preform 202 may be formed by partially sintering the first feed material to a density equal to a predetermined percentage of the theoretical maximum sintering density of the first feed material, such as from about 50% of the theoretical maximum sintering density of the first feed material to about 90% of the theoretical maximum sintering density of the first feed material, from about 55% of the theoretical maximum sintering density of the first feed material to about 85% of the theoretical maximum sintering density of the first feed material, or from about 60% of the theoretical maximum sintering density of the first feed material to about 80% of the theoretical maximum sintering density of the first feed material. Similarly, the second preform 204 may be formed by partially sintering the second feed material to a density equal to a predetermined percentage of a theoretical maximum sintering density of the second feed material, such as from about 50% of the theoretical maximum sintering density of the second feed material to about 90% of the theoretical maximum sintering density of the second feed material, from about 55% of the theoretical maximum sintering density of the second feed material to about 85% of the theoretical maximum sintering density of the second feed material, or from about 60% of the theoretical maximum sintering density of the second feed material to about 80% of the theoretical maximum sintering density of the second feed material. The predetermined percentage of the theoretical maximum sintering density of the first preform 202 may be the same as the predetermined percentage of the theoretical maximum sintering density of the second preform 204. Alternatively, the predetermined percentage of the theoretical maximum sintering density of the first preform 202 may be different that the predetermined percentage of the theoretical maximum sintering density of the second preform 204.

The first feed material of the first preform 202 and the second feed material of the second preform 204 may be dissimilar in that they each are formed of and include a different class of materials. For example, the first feed material may be one of a ceramic, a metal, or a composite and the second feed material may be another of a ceramic, a metal, or a composite. Alternatively, the first feed material and the second feed material may be formed of and include a different subclass of material. For example, the first feed material may be one of an alkali metal, an alkaline earth metal, a ferrous metal, a transition metal, a post-transition metal, a lanthanide, an actinide, a heavy metal, a refractory metal, a metallic oxide, a non-metallic oxide, a carbide, or a nitride and the second feed material may be another of an alkali metal, an alkaline earth metal, a ferrous metal, a transition metal, a post-transition metal, a lanthanide, an actinide, a heavy metal, a refractory metal, a metallic oxide, a non-metallic oxide, a carbide, or a nitride. Alternatively, or additionally, the first feed material and the second feed material may include one or more dissimilar properties, such as, a chemical composition, a lattice structure, a melting point, a sintering temperature, or a coefficient of thermal expansion (CTE). The dissimilar property of the first feed material may differ from the dissimilar property of the second feed material by greater than or equal to about 25%, such as greater than or equal to about 10%, greater than or equal to about 5%, greater than or equal to about 3%, or greater than or equal to about 1%.

One or more properties of the first feed material and the second feed material may be similar (e.g., differ by less than or equal to about 15%, about 10%, about 5%, about 3%, or about 1%) while one or more other properties of the first feed material and the second feed material may be substantially dissimilar (e.g., differ by greater than or equal to about 15%, about 10%, about 5%, about 3%, or about 1%). For example, a melting temperature of the first feed material and a melting temperature of the second feed material may be dissimilar while a CTE of the first feed material and a CTE of the second feed material may be substantially similar. The first preform and the second preform may deform at varying rates during the final sintering process (e.g., bonding process). Accordingly, providing a first feed material with a CTE within a predetermined limit (e.g., less than about 15%, about 10%, about 5%, or about 1%) of a CTE of the second feed material may prevent tooling failure during the final sintering process (e.g., bonding process). Alternatively, or additionally, providing a first feed material with a sintering temperature within a predetermined limit (e.g., within about 15%, about 10%, about 5%, about 3%, or about 1%) of a sintering temperature of the second feed material may allow for greater diffusion between the first preform and the second preform, resulting in a bonded article with a higher final density. The difference between the sintering temperature of the first feed material and the sintering temperature of the second feed material may be less than a predetermined amount (e.g., less than about 100° C., less than about 200° C., less than about 300° C., less than about 400° C., or less than about 500° C.). The properties (e.g., the CTE or sintering temperature) of the first feed material and the second feed material may be selected based on the tooling design of the SPS assembly (e.g., SPS assembly 300 shown in FIG. 3). For example, the SPS assembly may be configured with a hot zone and a cold zone where a temperature of the hot zone (e.g., a zone containing the first preform) differs from a temperature of the cold zone (e.g., a zone containing the second preform) by a predetermined amount (e.g., by about 10%, about 5%, or about 1%). The use of hot and cold zones in the SPS assembly may facilitate the bonding of materials with greater dissimilarities.

Each of the first feed material and the second feed material may be electrically conductive, one of the first feed material and the second feed material may be electrically conductive and the other of the first feed material and the second feed material may be electrically insulative, or each of the first feed material and the second feed material may be electrically insulative.

The first preform 202 and the second preform 204 may be sintered together to form a bonded article 200, as shown in FIG. 2B, by the final sintering process. A final density of the resulting bonded article 200 may be about equal to or greater than a predetermined percentage of a combined theoretical maximum sintering density. The combined theoretical maximum sintering density may be an estimated theoretical maximum sintering density of the bonded article 200 based on an average value of the theoretical maximum sintering density of the first feed material used to form the first preform 202 and the theoretical maximum sintering density of the second feed material used to form the second preform 204. The final density of the bonded article 200 may be greater than or equal to about 90% of the combined theoretical maximum sintering density, such as greater than about 95% of the combined theoretical maximum sintering density, greater than about 97% of the combined theoretical maximum sintering density, greater than about 98% of the combined theoretical maximum sintering density, or greater than about 99% of the combined theoretical maximum sintering density.

Except for bonded article 200 having first preform 202 and second preform 204 of different colors, the bonded article 200 may exhibit no visible interface (e.g., bond line) between the first preform 202 and the second preform 204. An interface between the first preform 202 and the second preform 204 in the resulting bonded article 200 may not be visible to the naked eye or with optical microscopy, such as stereo microscopy or scanning electron microscopy. In some examples, the bonded article 200 has no interface that is visible with microscopy techniques that are configured to achieve up to about a 2000× magnification. The absence of an interface may indicate a stronger bond between the first preform 202 and the second preform 204, which may result in greater mechanical strength of the bonded article 200 as compared to articles formed by conventional bonding techniques. However, bonded article 200 having first preform 202 and second preform 204 of different colors may exhibit a visible interface (e.g., bond line) between the first preform 202 and the second preform 204.

Figure 3:
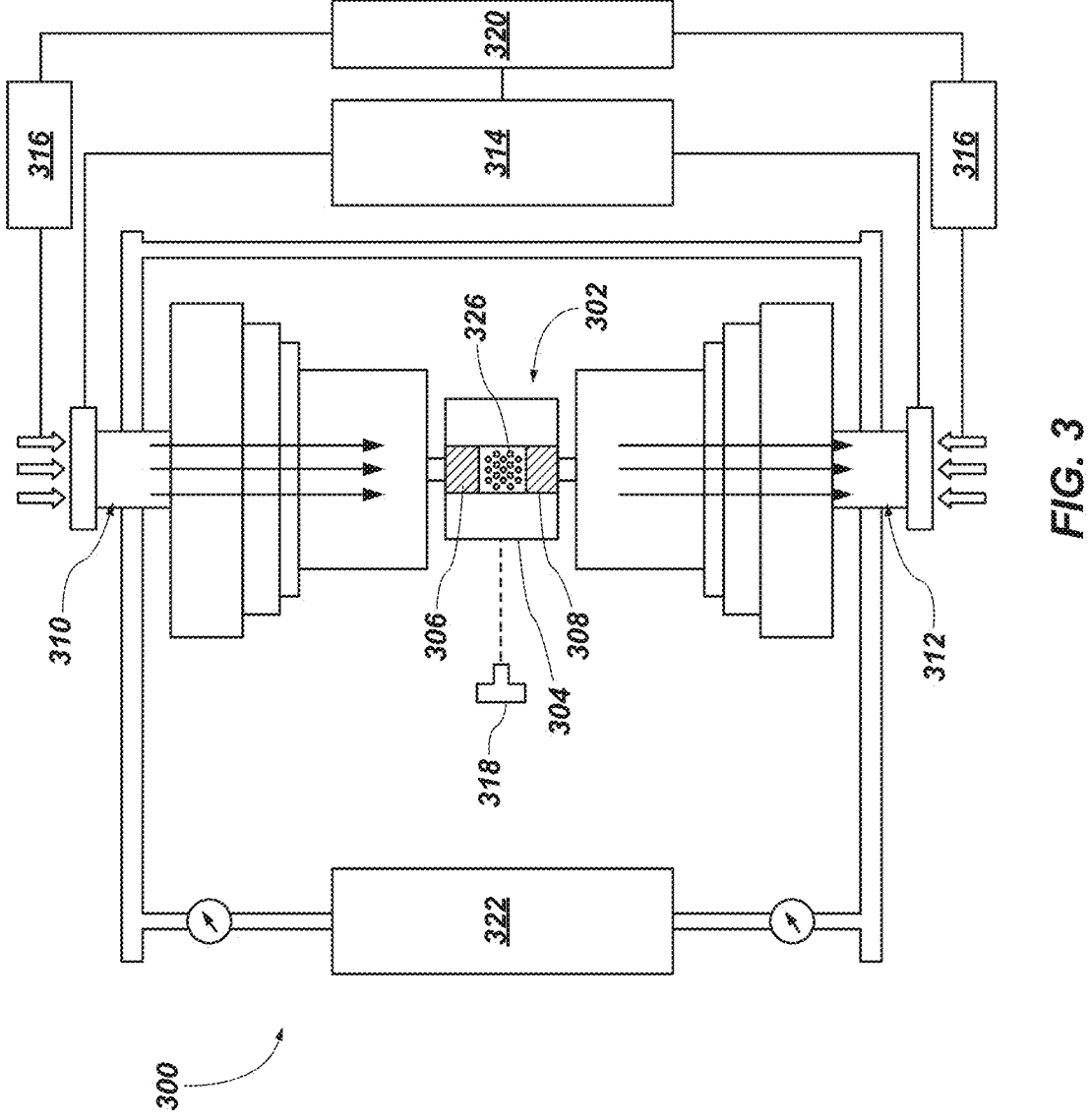
FIG. 3 is a schematic diagram of a spark plasma sintering (SPS) assembly.

As described in reference to FIG. 3, the sintering process (e.g., the partial sintering process or the final sintering process) may be performed by a spark plasma sintering assembly, or an SPS assembly 300 (e.g., electric field assisted sintering (EFAS) assembly). While an SPS assembly 300 is described herein, it may be understood that other suitable assemblies (e.g., hot-press sintering assemblies, pressureless sintering assemblies, or microwave sintering assemblies) may be used for the preform sintering process. For the final sintering process, hot-press sintering assemblies or microwave sintering assemblies may be used. The SPS assembly 300 may be configured to form the first preform 102, the second preform 104, the first preform 202, and/or the second preform 204 described above during one or more partial sintering processes. The SPS assembly 300 may also be configured to bond the first preform 102 to the second preform 104 and/or bond the first preform 202 to the second preform 204 to form the bonded article 100 and/or bonded article 200 during a final sintering process.

The sintering process (e.g., the partial sintering process or the final sintering process) may involve applying a combination of pressure and/or electrical current (e.g., pulsed or unpulsed direct current (DC) or alternating current (AC)) to a feed material 326 or first preform 102, 202 and second preform 104, 204 in a controlled environment (e.g., an environment in which pressure and temperature are controllable) to form a partially sintered preform or a bonded article, respectively. The application of the electrical current generates heat internally within the feed material 326 or the first preform 102, 202 and second preform 104, 204. External heat may also be applied to the feed material 326 or first preform 102, 202 and second preform 104, 204 within the controlled environment.

The materials described above may be used as the feed material 326 to form the first preform 102, 202 and/or the second preform 104, 204 for the partial sintering process. The first preform 102, 202 and the second preform 104, 204 may be used in place of the feed material 326 shown in FIG. 3 for the final bonding process (e.g., the final sintering process) to form the bonded article 100, 200. The feed material 326 or the first preform 102, 202 and second preform 104, 204 may be placed into a die assembly 302 of the SPS assembly 300. Particles of the feed material 326 may include a single particle size or a distribution of particle sizes, such as a multimodal distribution of particle sizes. For example, the feed material 326 may comprise, consist essentially of, or consist of particles of substantially uniform size or may be provided as a mixture of different particle sizes, which may minimize formation of pores in the partially sintered first preforms 102, 202 and second preforms 104, 204 and in the bonded article 100, 200. With multiple particle sizes, smaller particles (e.g., smaller flakes) may function to fill in what would otherwise be voids in the interstitial spaces between larger particles (e.g., larger flakes). The feed material 326 may include unprocessed powders or flakes of a desired material composition or previously sintered components (e.g., the first preform 102, 202 and/or the second preform 104, 204).

The SPS assembly 300 includes a die assembly 302 including a die 304, an upper punch 306, and a lower punch 308. The die assembly 302 may be made of graphite or other material that exhibits a high melting temperature and/or high sintering temperature. The die 304 may be configured as a large cylindrical component with a through hole bored between a planar top surface and a planar bottom surface thereof. The upper punch 306 and the lower punch 308 are configured to be received by the through hole of the die 304. Together, the die 304, the upper punch 306 and the lower punch 308 define a cavity for receiving the feed material 326 or the first preform 102, 202 and second preform 104, 204. After the feed material 326 or the first preform 102, 202 and second preform 104, 204 are placed into the cavity defined by the die assembly 302, the SPS assembly may be used to apply a combination of electric current and/or pressure to heat the feed material 326 or the first preform 102, 202 and second preform 104, 204 and/or the die assembly 302.

The SPS assembly 300 may include an upper electrode 310 electrically coupled to the upper punch 306 (e.g., soldered to or in physical contact with the upper punch 306) and a lower electrode 312 electrically coupled to the lower punch 308 (e.g., soldered to or in physical contact the lower punch 308) for conducting the electric current through the upper punch 306 and lower punch 308. The electric current may be applied to one of the upper punch 306 and the lower punch 308, flow through the upper punch 306 or lower punch 308, through the feed material 326 or the first preform 102, 202 and second preform 104, 204, and out of the other of the upper punch 306 and the lower punch 308 during the sintering process.

The magnitude of electric current applied to the die assembly 302 and consequently, across the feed material 326 or the first preform 102, 202 and second preform 104, 204, depends on the desired temperature to which the feed material 326 is to be heated. The sintering process may use the electric current to heat the feed material 326 or the first preform 102, 202 and second preform 104, 204 by so-called "Joule Heating." The magnitude of electric current applied may correspond to a desired fabrication temperature during the sintering process and may be selected depending on the properties of the feed material 326 or the first preform 102, 202 and second preform 104, 204, the geometry of the die 304, the geometry of the upper punch 306, the geometry of the lower punch 308, and the amount of feed material 326 or one or more dimensions of the first preform 102, 202 and second preform 104, 204 to be sintered. The electric current applied to the upper electrode 310 and the lower electrode 312 may be initiated by a current controller 314. The electrical current applied during the sintering process, according to embodiments of the disclosed processes, may range from about 0 amps (A) to about 150,000 A, such as from about 10,000 A to about 140,000 A, from about 20,000 A to about 130,000 A, from about 30,000 A to about 120,000 A, from about 40,000 A to about 110,000 A, or from about 50,000 A to about 100,000 A.

In some embodiments, the electrical current is applied by subjecting the feed material 326 or the first preform 102, 202 and second preform 104, 204, and the die assembly 302, to an applied electric field. The applied electric field may be greater than or equal to about 4 V/cm (e.g., from about 4 V/cm to about 20 V/cm).

The fabrication temperature of the sintering process may include one or more of a temperature of the die 304, the upper punch 306, the lower punch 308, or a temperature of the feed material 326 or the first preform 102, 202 and second preform 104, 204. The fabrication temperature generated by the applied electric current may depend on the resistivity and the thickness of the material of the die assembly 302 (e.g., the die 304, the upper punch 306, and the lower punch 308), the geometry of the die assembly 302, and the material composition of the feed material 326 or the first preform 102, 202 and second preform 104, 204. In some embodiments, the fabrication temperature is between about 200° C. to about 2600° C., such as from about 200° C. to about 600° C., from about 600° C. to about 1200° C., about 1000° C. to about 2000° C., or from about 2000° C. to about 2600° C.

After, or at substantially the same time as, applying electrical current, the SPS assembly 300 may apply pressure (e.g., compressive force) to the punch (e.g., upper punch 306, lower punch 308), and across the feed material 326 or the first preform 102, 202 and second preform 104, 204 under constraint of the die assembly 302. The SPS assembly 300 may include a mechanism for applying pressure, such as, a power-fluid system 316 (e.g., a pneumatic system or hydraulic system) coupled to the upper punch 306 and the lower punch 308. The power-fluid system 316 of the SPS assembly 300 may apply pressure to the feed material 326 or the first preform 102, 202 and second preform 104, 204 through the upper punch 306 and/or lower punch 308. The pressure applied to the feed material 326 may be from about 0 mega pascals (MPa) to greater than 100 MPa, such as from about 10 MPa to about 100 MPa, from about 15 MPa to about 90 MPa, from about 20 MPa to about 80 MPa, from about 25 MPa to about 70 MPa, from about 30 MPa to about 60 MPa, or from about 35 MPa to about 50 MPa.

The sintering process may include adjusting the electric current and pressure to maintain a predetermined heating rate in the die assembly 302. For example, the heating rate may be in a range of from about 1° C. per minute (° C./min) to about 300° C./min, such as from about 10° C./min to about 250° C./min, from about 50° C./min to about 200°

C./min, or from about 75° C./min to about 175° C./min. The heating may be monitored by a pyrometer 318 external to the die assembly 302.

Additionally, or alternatively, the sintering process may include adjusting the electric current and pressure to maintain the fabrication temperature for a pre-determined amount of time (e.g., hold time). The hold time may range from about 1 minute (min) to about 90 min, such as from about 1 min to about 60 min, from about 3 min to about 30 min, from about 4 min to about 20 min or about 5 min to about 15 min.

The application and adjustment of both electric current and pressure may be controlled by the system controller 320. The system controller 320 may be operably coupled to the current controller 314, the power-fluid system 316, and the pyrometer 318.

Additional processing parameters, such as bonding atmosphere, heating rate, and surface finish may be selected to achieve the desired material properties of the formed partially sintered first preform 102, 202 and second preform 104, 204 or bonded articles 100, 200. For example, in preparation for the application of the electric current and pressure, and after the feed material 326 or the first preform 102, 202 and second preform 104, 204 are placed in the die assembly 302, the SPS assembly 300 may be evacuated and back filled with argon, helium, or another inert gas. The evacuated pressure may be in the range of from about $1\times10^{-2}$ Torr to about $1\times10^{-3}$ Torr. After the application of electric current and applying the pressure, the partially sintered first preform 102, 202, second preform 104, 204, or bonded article 100, 200 is removed from the die assembly 302 of the SPS assembly 300. The partially sintered first preform 102, 202, second preform 104, 204 or bonded article 100, 200 may be cooled by a cooling system 322 or may cool slowly by dissipating heat to the surrounding environment before removal from the SPS assembly 300.

Figure 4:
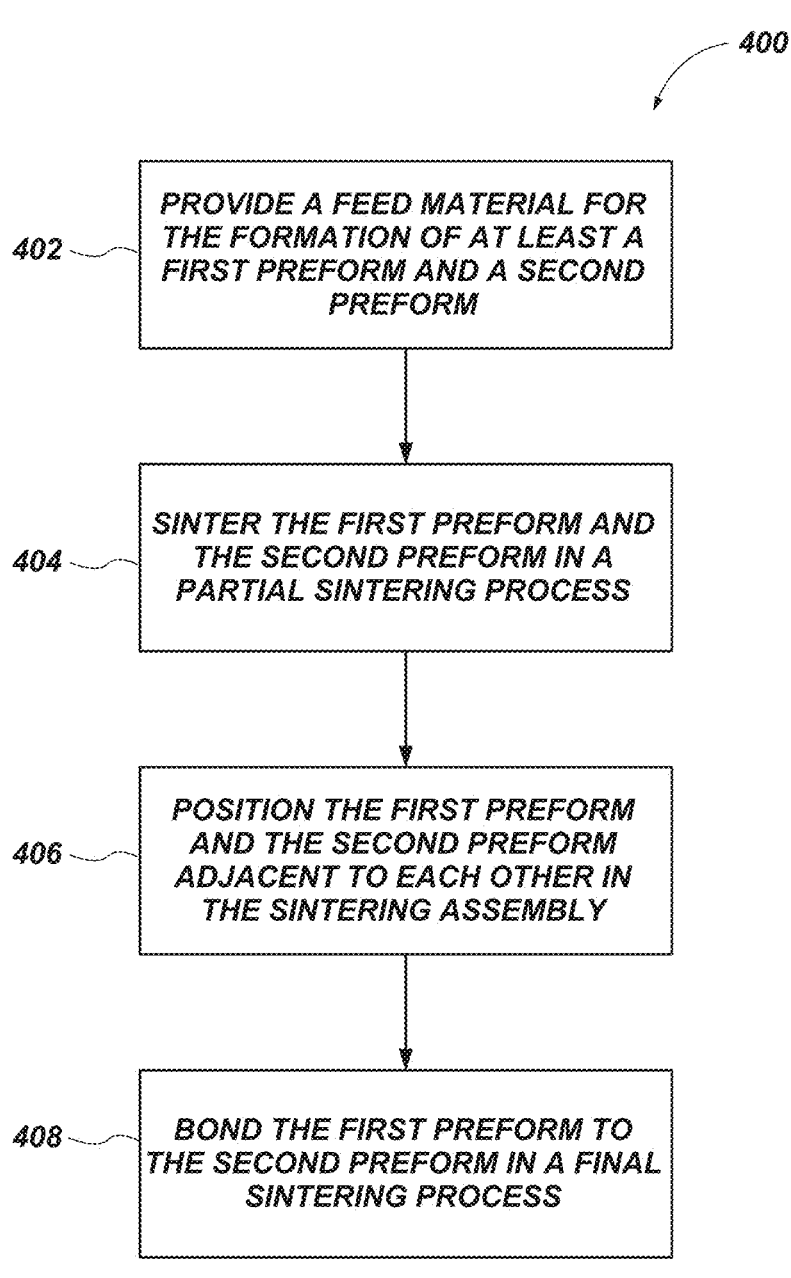
FIG. 4 illustrates an aspect of the subject matter in accordance with embodiments of the disclosure.

A flow diagram for the bonding of similar materials or dissimilar materials to form bonded articles is shown in FIG. 4. In FIG. 4, a method 400 includes an act 402 of providing a feed material for the formation of at least a first preform and a second preform. The feed material of the first preform (e.g., first preform 102) and the feed material of the second preform (e.g., second preform 104) may be the same as one another in that they each come from the same class or subclass of materials or have the same chemical composition, as previously described. In some embodiments, the chemical composition of the feed materials of the first and second preforms is substantially identical. For instance, the feed material of the first and second preforms is formed of and includes alumina (e.g., aluminum oxide), is formed of and includes tungsten, is formed of and includes copper, is formed of and includes boron carbide, or is formed of and includes yttrium oxide.

The feed material of the first and second preforms (e.g., first preform 202 and second preform 204) may be dissimilar in that the feed material in each of the first and second preform comes from a different class or subclass of materials, or have different chemical compositions, as previously described. For instance, the feed material of the first preform is formed of and includes copper, and the feed material of the second preform is formed of and includes aluminum; the feed material of the first preform is formed of and includes boron carbide, and the feed material of the second preform is formed of and includes alumina; the feed material of the first preform is formed of and includes aluminum, and the feed material of the second preform is formed of and includes stainless steel; the feed material of the first preform is formed of and includes alumina, and the feed material of the second preform is formed of and includes yttria; the feed material of the first preform is formed of and includes copper, and the feed material of the second preform is formed of and includes nickel; or the feed material of the first preform is formed of and includes tungsten, and the feed material of the second preform is formed of and includes boron carbide.

In an act 404, the feed material of the first preform and the second preform may be partially sintered through the partial sintering process to form the first preform and the second preform. During the partial sintering process, the feed material may be placed in the SPS assembly 300 and subjected to a sintering process (e.g., the partial sintering process) to form the first preform and the second preform (e.g., first preform 102, 202 and second preform 104, 204). The partial sintering process includes applying a pressure and an electric current to the first feed material and/or second feed material to increase the temperature of the first feed material and/or second feed material to a desired first fabrication temperature (e.g., about 400° C., about 450° C., about 800° C., about 1000° C., about 1100° C., about 1300° C., about 1400° C., about 1800° C., about 2000° C., or about 2600° C.). The pressure applied to the first feed material and/or second feed material may be about 0 MPa, about 30 MPa, about 40 MPa, about 50 MPa, or about 55 MPa. The electric current applied may be about 1,000 A, about 5,000 A, about 10,000 A, about 25,000 A, about 50,000 A, about 75,000 A, about 100,000 A, about 125,000 A, or about 150,000 A. The temperature of the first feed material and/or second feed material may be increased at a first heating rate (e.g., about 50° C./min, about 100° C./min, about 150° C./min, about 200° C./min, about 250° C./min, or about 300° C./min) until it reaches the first fabrication temperature. The pressure and/or electric current may then be adjusted to maintain the first fabrication temperature for a first hold time (e.g., about 0 min, about 1 min, about 5 min, about 10 min, about 15 min, about 30 min, about 45 min, about 60 min, or about 90 min). The first fabrication temperature may be above a sintering temperature of the feed material of the first preform and/or a sintering temperature of the feed material of the second preform. Additionally, the first fabrication temperature may be below the melting point of the feed material of the first and/or second preform. The first heating rate, first fabrication temperature, first hold time, and other parameters may be adjusted to achieve a desired density of the first preform and/or second preform.

After the first hold time, the partial sintering process may optionally include adjusting the pressure and electric current to adjust (e.g., increase or decrease) the temperature to a second fabrication temperature (e.g., about 400° C., about 450° C., about 800° C., about 1000° C., about 1100° C., about 1300° C., about 1400° C., about 1800° C., about 2000° C., or about 2600° C.). The temperature may be adjusted at a desired second heating rate (e.g., about 50° C./min, about 100° C./min, about 150° C./min, about 200° C./min, about 250° C./min, or about 300° C./min). The pressure and electric current may then be adjusted to maintain the temperature at the second fabrication temperature for a second hold time (e.g., 0 min, 1 min, 5 min, or 10 min). The second fabrication temperature may be above a sintering temperature of the feed material of the first preform and/or a sintering temperature of the feed material of the second preform. Additionally, the second fabrication temperature may be below the melting point of the feed material of the first preform and/or the feed material of the second preform.

The first preform and/or second preform may then be cooled and removed from the SPS assembly 300.

The density of the first preform and/or second preform may be substantially equal to a desired percentage (e.g., about 50%, about 60%, about 70%, about 80%, or about 90%) of the theoretical maximum sintering density of the feed material of the first and second preforms. The feed materials of the first preform and second preform may be partially sintered separately (e.g., during separate or discrete partial sintering processes) to form the first preform and the second preform. Alternatively, a divider or release agent may be positioned between the feed materials of the first preform and the second preform so the feed materials may be partially sintered during the same partial sintering process. In some embodiments, the feed materials of the first preform and the second preform may be partially sintered to about the same density percentage of the theoretical maximum sintering density of the feed material of the first and second preforms. In some embodiments, the first preform may be partially sintered to a different density percentage than the second preform.

The first preform and the second preform may be configured in a variety of shapes depending on a desired shape of the bonded article. The first preform and the second preform may be individually shaped to form complex geometries of the bonded article. For example, the first preform and the second preform may be similarly shaped and may each be configured as a sheet, a layer, a plate, a hemisphere, a cylinder, a prism, or other configuration. Alternatively, the first preform and the second preform may have dissimilar shapes. The first preform may be configured as one of a sheet, a layer, a plate, a hemisphere, a cylinder, a prism, or other configuration and the second preform may be configured as another of a sheet, a layer, a plate, a hemisphere, a cylinder, a prism, or other configuration. For example, the first preform may be configured as a hemisphere and the second preform may be configured as a flat plate to form a bonded article configured as an acorn shape. Each of the first preform and the second preform may be configured as a hemisphere to form a bonded article configured as a hollow or solid sphere. The first preform may be configured as a cube and the second preform may be configured as a cube to form a bonded article configured as a prism. The first preform may be configured as a flat sheet and the second preform may be configured as a flat sheet to form a bonded article configured as a flat sheet. The resulting bonded article may be used as a component in electronics, nuclear, aerospace, or other industries in which extreme temperature and/or pressure conditions are encountered.

The first preform may include a first surface and the second preform may include a second surface to be bonded to the first surface of the first preform. The first surface and the second surface may undergo preparation (e.g., sanding of the first surface and/or second surface) prior to a bonding process (e.g., the final sintering process) described below. In some embodiments, the first preform is bonded to the second preform without any preparation of the first surface and the second surface.

In an act 406, the first preform and second preform may be positioned adjacent to each other in the sintering assembly (e.g., SPS assembly 300). The first surface of the first preform may be positioned adjacent to the second surface of the second preform with the first surface in contact with the second surface. The first preform may be placed adjacent to the second preform without the presence of any interlayers or powders (e.g., nano powders) between the first preform and the second preform. In other words, the first preform and the second preform may be in direct contact.

In an act 408, the first preform and the second preform may then be bonded 408 together during a bonding process (e.g., the final sintering process) to form the bonded article (e.g., bonded article 100, 200). The first preform and the second preform may be bonded without using interlayers, powders (e.g., nano powders), binders, or other materials (e.g., epoxies, cements) between the first surface of the first preform and the second surface of the second preform. The first preform and the second preform may be bonded without additional preparation of the surfaces of the first preform and the second preform, or the surfaces may be minimally prepared, such as by sanding, before the bonding process.

The first preform and second preform may be placed in the SPS assembly 300 and subjected to a bonding process (e.g., the final sintering process) to form the bonded article. The bonding process includes applying a pressure and an electric current to the first preform and the second preform to increase the temperature of the first preform and/or second preform to a desired first bonding temperature (e.g., about 400° C., about 450° C., about 800° C., about 1000° C., about 1100° C., about 1300° C., about 1400° C., about 1800° C., about 2000° C., or about 2600° C.). The pressure applied to the first preform and second preform may be about 0 MPa, about 30 MPa, about 40 MPa, about 50 MPa, or about 55 MPa. The electric current applied may be about 1,000 A, about 5,000 A, about 10,000 A, about 25,000 A, about 50,000 A, about 75,000 A, about 100,000 A, about 125,000 A, or about 150,000 A. The temperature of the first preform and/or second preform may be increased at a first heating rate (e.g., about 50° C./min, about 100° C./min, about 150° C./min, about 200° C./min, about 250° C./min, or about 300° C./min) until it reaches the first bonding temperature. The pressure and/or electric current may then be adjusted to maintain the first bonding temperature for a first hold time (e.g., about 0 min, about 1 min, about 5 min, about 10 min, about 15 min, about 30 min, about 45 min, about 60 min, or about 90 min). The first bonding temperature may be above a sintering temperature of the first preform and/or a sintering temperature of the second preform. Additionally, the first bonding temperature may be below the melting point of the first preform and/or second preform. The first heating rate, first bonding temperature, first hold time, and other parameters may be adjusted to achieve a desired density of the bonded article.

After the first hold time, the bonding process may optionally include adjusting the pressure and electric current to adjust (e.g., increase or decrease) the temperature of the first preform and/or second preform to a second bonding temperature (e.g., about 400° C., about 450° C., about 800° C., about 1000° C., about 1100° C., about 1300° C., about 1400° C., about 1800° C., about 2000° C., or about 2600° C.). The temperature of the first preform and/or second preform may be increased at a desired second heating rate (e.g., about 50° C./min, about 100° C./min, about 150° C./min, about 200° C./min, about 250° C./min, or about 300° C./min). The pressure and electric current may then be adjusted to maintain the temperature of the first preform and/or second preform at the second bonding temperature for a second hold time (e.g., 0 min, 1 min, 5 min, or 10 min). The second bonding temperature may be above a sintering temperature of the first preform and/or a sintering temperature of the second preform. Additionally, the second bonding temperature may be below the melting point of the first preform and/or second preform. The bonded article 100, 200 may then be cooled and removed from the SPS assembly 300.

The density of the bonded article 100, 200 may be substantially equal to or greater than a desired percentage (e.g., equal to or greater than 90%, equal to or greater than 95%, equal to or greater than 97%, equal to or greater than 98%, or equal to or greater than 99%) of the combined theoretical maximum sintering density of the bonded article 100, 200. The combined theoretical maximum sintering density may be an estimated theoretical maximum sintering density of the bonded article based on an average value of the theoretical maximum sintering density of the first preform and the theoretical maximum sintering density of the second preform.

The above-described system and methods allow for the formation of complex articles utilizing a sintering process, such as an SPS or EFAS process. In conventional sintering processes, many complex geometries cannot be formed. For example, articles with hollow portions, articles having features with varying sizes, and articles having features with dissimilar materials may be difficult or impossible to manufacture during a single sintering process. Furthermore, as explained above, conventional joining methods may result in unsatisfactory bond strength between sintered parts or may not be feasible due to the introduction of cracking or other defects during a conventional bonding process.

Examples of geometries that can be formed using the above systems and methods are shown in FIGS. 5A-8. FIGS. 5A-5C show views of an article 500 formed by the above-described systems and methods. The article 500 may be formed in a geometry of a hollow sphere. The article 500 may be formed from a partially sintered first preform 502 and a partially sintered second preform 504. The first preform 502 may be formed as a hemisphere having a first concave portion 506. Similarly, the second preform 504 may be formed as a hemisphere having a second concave portion 508. A dimension T of walls of the two hemispheres may provide sufficient mechanical strength that the partially sintered preforms 502, 504 maintain their shape following the partial sintering process and during the final sintering process. A first preform 502 may comprise a first bonding surface 510 and the second preform 504 may comprise a second bonding surface 512. The first preform 502 and the second preform 504 may be bonded together along the first bonding surface 510 and the second bonding surface 512 as described above. The resulting article 500 includes a hollow portion that otherwise would be difficult or impossible to form utilizing conventional sintering processes. A volume of the hollow portion of the article 500 may depend on a volume of the first concave portion 506 and the second concave portion 508. While an interface between the partially sintered first preform 502 and the partially sintered second preform 504 is shown in FIGS. 5B and 5C, the article 500 is understood to lack such an interface.

FIGS. 6A-6C show views of an article 600 formed by the above-described systems and methods. The article 600 may be formed in a geometry having an "acorn" shape. The article 600 may be formed from a partially sintered first preform 602 and a partially sintered second preform 604. The first preform 602 may, for example, be formed as a hemisphere having a concave portion 606. The second preform 604 may be formed as a cylindrical member having a flat surface 608. The first preform may comprise a first bonding surface 610 and the second preform 604 may comprise a second bonding surface 612. The first preform 602 and the second preform 604 may be bonded together along the first bonding surface 610 and the second bonding surface 612 as described above. The resulting article 600 includes a hollow portion that otherwise would be difficult or impossible to form utilizing conventional joining or sintering processes. While an interface between the partially sintered first preform 602 and the partially sintered second preform 604 is shown in FIGS. 6B and 6C, the article 600 is understood to lack such an interface.

Figure 7:
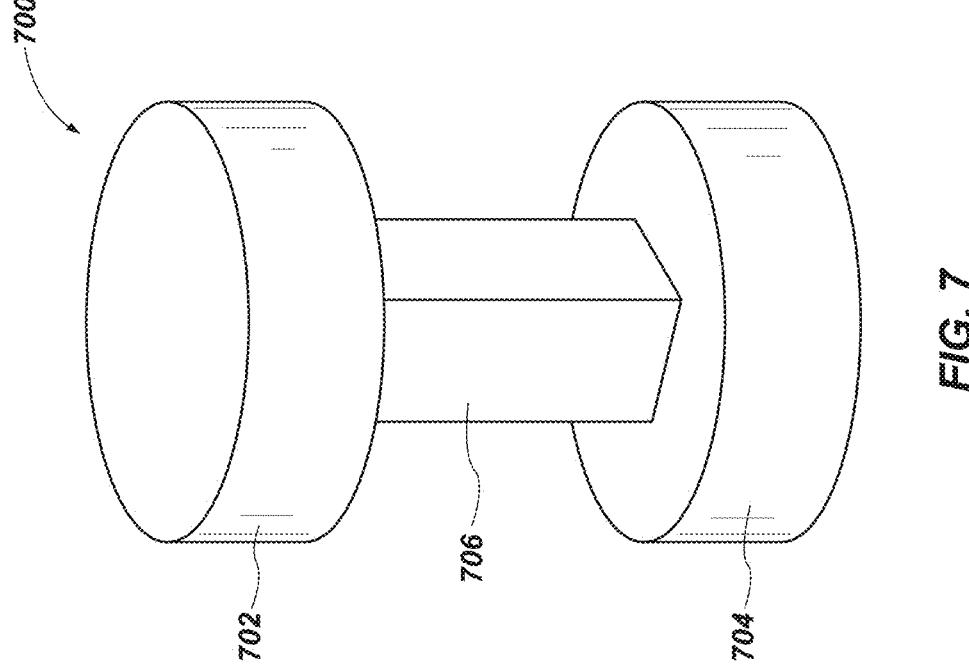
FIG. 7 is a perspective, exploded view of an article formed by bonding partially sintered parts in accordance with embodiments of the disclosure.

The above-described systems and methods may further facilitate the joining together of more than two preforms to form complex geometries, such as geometries formed from parts having different cross-sections and having different dimensions from one another. In FIG. 7, an article 700 is formed by joining together a first preform 702, a second preform 704, and a third preform 706. Specifically, the third preform 706 is placed between the first preform 702 and the second preform 704 and is bonded to each of the first preform 702 and the second preform 704. In some embodiments, the first preform 702 and the second preform 704 may have substantially similar geometries, e.g., cylindrical geometries. The third preform 706 may have a different geometry. The third preform 706 may have a rectangular cross section and may be relatively taller and narrower than the first preform 702 and the second preform 704. However, other geometries of the third preform 706 are possible. The above-described systems and methods may facilitate the forming of the article 700 with a narrow center portion (e.g., the third preform 706) relative to the wider top and bottom portions (e.g., the first preform 702 and the second preform 704) which would be difficult or impossible to form utilizing conventional joining or sintering processes.

Figure 8:
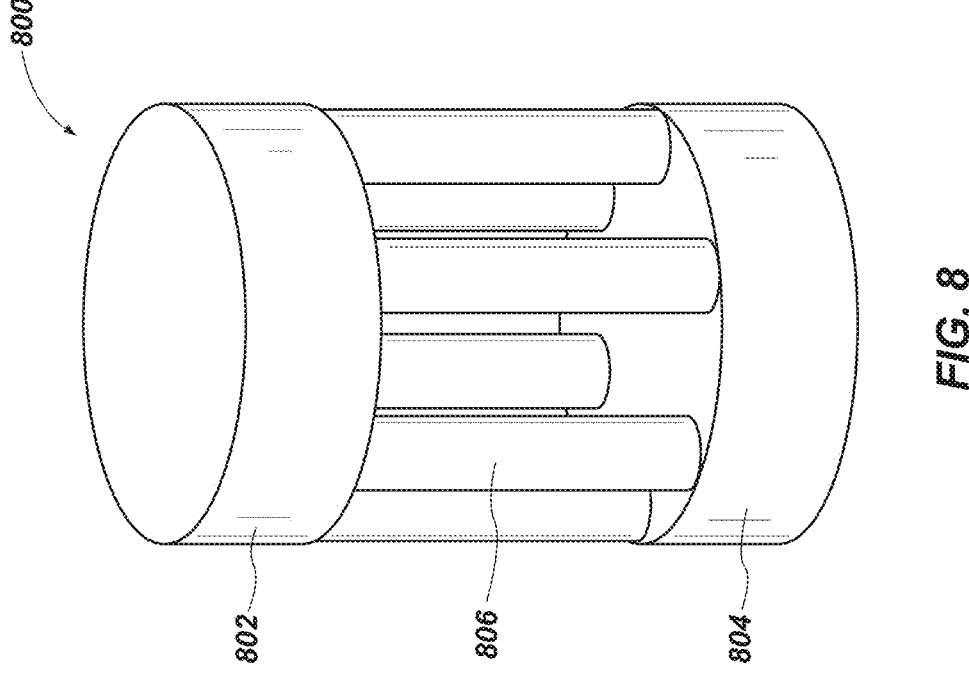
FIG. 8 is a perspective, exploded view of an article formed by bonding partially sintered parts in accordance with embodiments of the disclosure.

In FIG. 8, an article 800 is formed by joining together a first preform 802, a second preform 804, and a plurality of third preforms 806. The third preforms 806 are placed between the first preform 802 and the second preform 804 and are bonded to each of the first preform 802 and the second preform 804. In some embodiments, the first preform 802 and the second preform 804 may have substantially similar geometries, e.g., cylindrical geometries. The third preforms 806 may have cylindrical geometries but may be relatively taller and narrower than the first preform 802 and the second preform 804. However, other geometries of the third preform are possible. The above-described systems and methods may facilitate the forming of the article 800 as shown in FIG. 8 which would be difficult or impossible to form utilizing conventional joining or sintering processes.

In the above-described systems and methods, the preforms may be formed via the partial sintering process and may be bonded together via the final sintering process to form an article. The above-described systems and methods may facilitate the formation of articles having complex geometries which are not easily formed via conventional sintering processes. The systems and methods described herein may also facilitate bonding between articles which otherwise are difficult to bond together, such as the bonding of dissimilar materials, or the bonding of materials that would typically crack or otherwise be prone to defects as a results of a conventional bonding process (e.g., ceramic materials).

The preforms may be partially sintered in the partial sintering process to a density such that the preforms have sufficient structural integrity to withstand subsequent handling and the temperatures and pressures associated with the final sintering process. The partially sintered preforms may, for example, exhibit sufficient mechanical strength that the partially sintered preforms maintain their shape following the partial sintering process. For example, the preforms may be partially sintered to at least a density percentage of about 50% of a theoretical maximum sintering density. In some embodiments, the preforms may be partially sintered to different density percentages. For example, if a first preform is relatively larger in one or more dimensions than a second preform, the first preform may be partially sintered to a higher density percentage than the second preform. In some embodiments, the differences in density percentages of the first and second preforms in the partial sintering process may be based on the feed materials used for the first preform and the second preform.

For some geometries of articles formed by the above-mentioned methods, a first preform may not be partially sintered, but may comprise a feed material, such as a powder. The second preform may be partially sintered. In the final sintering process, the first preform may be both sintered and bonded to the second preform to form the article.

In some embodiments, the first preform and the second preform may be formed via an additive manufacturing process. With some additive manufacturing processes, the first preform and the second preform may be formed having a density percentage that is below a theoretical maximum sintering density of the feed material used in the first preform and the second preform. For example, a density percentage of the first preform and the second preform formed by the additive manufacturing process may be less than about 95%, less than about 90%, less than about 85%, or less than about 80%. Depending on the type of additive manufacturing process used to form the first preform and the second preform, the first preform and the second preform may be partially sintered. The preforms formed via the additive manufacturing process may be bonded together in a final sintering process as described above.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A method of forming an article comprising:
 forming a first preform exhibiting a density percentage of from about 50% to about 90% of a theoretical maximum sintering density of a first feed material used to form the first preform;
 forming a second preform exhibiting a density percentage of from about 50% to about 90% of a theoretical maximum sintering density of a second feed material used to form the second preform, wherein the density percentage of the first preform is different from the density percentage of the second preform, and wherein the density percentage of the first preform relative to the second preform is based on at least one dimension of the first preform relative to the second preform;
 positioning the first preform directly adjacent to the second preform;
 bonding the first preform to the second preform via a final sintering process to form a bonded article such that the bonded article exhibits no visible interface between the first preform and the second preform using microscopy techniques configured to achieve about a 2000× magnification; and
 wherein the first preform is positioned in a hot zone and the second preform is positioned in a cold zone during the bonding step, and wherein a temperature of the hot zone differs from a temperature of the cold zone by at least one percent.

2. The method of claim 1, wherein forming the first preform and forming the second preform comprise additively manufacturing at least one of the first preform or the second preform.

3. The method of claim 1, wherein the first feed material is different in chemical composition than the second feed material, and the density percentage of the first preform relative to the second preform is based on the first feed material and the second feed material.

4. The method of claim 1, wherein bonding the first preform to the second preform comprises forming the bonded article comprising a hollow portion completely enclosed therein.

5. The method of claim 1, wherein the first preform comprises a cross-sectional area that is larger than a cross-sectional area of the second preform.

6. The method of claim 1, wherein the first feed material and the second feed material are ceramic materials.

7. The method of claim 6, further comprising preparing a bonding surface of at least one of the first preform or the second preform prior to bonding the first preform and the second preform.

8. The method of claim 1, wherein the method includes subjecting at least one of the first feed material, the second feed material, the first preform, and the second preform to an applied electric field of between about four V/cm to about twenty V/cm.

9. The method of claim 1, wherein the method includes subjecting at least one of the first feed material, the second feed material, the first preform, and the second preform to pressure of between about ten MPa to about one hundred MPa.

10. The method of claim 1, wherein the bonding step includes maintaining a heating rate of between about ten degrees C./min to about two hundred and fifty degrees C./min.

11. The method of claim 1, wherein the bonding step includes maintaining a fabrication temperature for a hold time of between about three minutes and about thirty minutes.

12. The method of claim 1, wherein the bonding step includes reducing a pressure to between about $1 \times 10^{-2}$ Torr to about $1 \times 10^{-3}$ Torr.

13. A method of forming an article comprising:
 partially sintering a first feed material to form a first preform, the first preform exhibiting a density percentage of from about 50% to about 90% of a theoretical maximum sintering density of the first preform;
 partially sintering a second feed material to form a second preform, the second preform exhibiting a density of from about 50% to about 90% of a theoretical maximum sintering density of the second preform, at least one of the first preform and the second preform comprising a hollow portion;
 positioning the first preform adjacent to the second preform;
 bonding the first preform to the second preform via a final sintering process to form a bonded article with the hollow portion completely enclosed within the bonded article wherein the bonded article exhibits no visible interface between the first preform and the second preform using microscopy techniques configured to achieve about a 2000× magnification; and wherein the first preform is positioned in a hot zone and the second preform is positioned in a cold zone during the bonding step, and wherein a temperature of the hot zone differs from a temperature of the cold zone by at least one percent.

14. The method of claim 13, wherein the method includes subjecting at least one of the first feed material, the second feed material, the first preform, and the second preform to an applied electric field of between about four V/cm to about twenty V/cm.

15. The method of claim 13, wherein the method includes subjecting at least one of the first feed material, the second feed material, the first preform, and the second preform to pressure of between about ten MPa to about one hundred MPa.

16. The method of claim 13, wherein the bonding step includes maintaining a heating rate of between about ten degrees C./min to about two hundred and fifty degrees C./min.

17. The method of claim 13, wherein the bonding step includes maintaining a fabrication temperature for a hold time of between about three minutes and about thirty minutes.

18. The method of claim 13, wherein the bonding step includes reducing a pressure to between about $1 \times 10^{-2}$ Torr to about $1 \times 10^{-3}$ Torr.

* * * * *